United States Patent
Boland et al.

(10) Patent No.: US 6,937,723 B2
(45) Date of Patent: Aug. 30, 2005

(54) ECHO DETECTION AND MONITORING

(75) Inventors: Simon Daniel Boland, Pennant Hills (AU); James D. Schreuder, Summer Hill (AU); Subramanian Sridharan, Brisbane (AU); Michael William Mason, Brisbane (AU); James Allen Cook, Brisbane (AU)

(73) Assignee: Avaya Technology Corp., Basking Ridge, NJ (US)

( * ) Notice: Subject to any disclaimer, the term of this patent is extended or adjusted under 35 U.S.C. 154(b) by 192 days.

(21) Appl. No.: 10/280,801

(22) Filed: Oct. 25, 2002

(65) Prior Publication Data

US 2004/0081315 A1 Apr. 29, 2004

(51) Int. Cl.[7] .............................................. H04M 1/00
(52) U.S. Cl. ..................... 379/406.06; 379/406.08; 379/406.01
(58) Field of Search ....................... 379/406.01, 406.06, 379/406.08, 406.1, 406.05

(56) References Cited

U.S. PATENT DOCUMENTS

| | | | |
|---|---|---|---|
| 5,909,384 A | | 6/1999 | Tal et al. |
| 5,999,901 A | | 12/1999 | Knittle et al. |
| 6,256,384 B1 | | 7/2001 | Trump |
| 6,654,463 B1 | * | 11/2003 | Leonidov et al. ...... 379/406.08 |
| 6,687,372 B1 | * | 2/2004 | Trump et al. .......... 379/406.01 |
| 6,771,701 B1 | * | 8/2004 | Klindworth et al. ........ 708/322 |

OTHER PUBLICATIONS

U.S. Appl. No. 10/152,716, filed May 22, 2002, Boland.
U.S. Appl. No. 10/153,106, filed May 22, 2002, Boland.
T. Yensen et al., "Echo Target Determination Using Acoustic Round Trip Delay for Voice Over IP Conferences", IEEE 0–7803–5471–0/99, pp. IV–348–IV351, 1999.

ITU–T P–Series Recommendation P.562 "Series P: Telephone Transmission Quality, Telephone Installations, Local Line Networks," May 2000.

ITU–T Recommendation P.561 "Telephone Transmission Quality Objective Measuring Apparatus," Feb. 1996.

ITU–T Recommendation COM 12–10–E, Study Group 12—Contribution 10, Nov. 2000.

ITU–T P–Series Recommendation P.862 "Series P: Telephone Transmission Quality, Telephone Installations, Local Line Networks," Feb. 2001.

Rix, et al., "PESQ—The New ITU Standard for End–to–End Speech Quality Assessment", AES $109^{th}$ Convention, Sep. 22–25, 2000.

Rix, et al., "The Perceptual Analysis Measurement System for Robust End–to–End Speech Quality Assessment," IEEE, 2000.

* cited by examiner

Primary Examiner—Jefferey F. Harold
(74) Attorney, Agent, or Firm—Sheridan Ross (57) ABSTRACT

Echo detection and monitoring systems and methods are provided. According to the invention, the outgoing and incoming voice bearer channels of a voice communication are monitored. The outgoing and incoming signals are time aligned, and measures are then taken to determine whether echo is present in the signal. In accordance with an embodiment of the present invention, the outgoing signal is fed through an adaptive filter.

21 Claims, 5 Drawing Sheets

ECHO DETECTION AND MONITORING

FIELD OF THE INVENTION

The present invention is directed to the detection of echo in voice communication systems. In particular, the present invention relates to detecting echo in voice communication systems that are in actual use.

BACKGROUND OF THE INVENTION

In connection with voice communication networks, the presence of echoes is a known problem. Such echoes may result from hybrid unbalanced conditions within communication hardware. In addition, acoustical feedback can cause echoes. Whether an echo is perceptible to a user is generally determined by the signal level of the echo return and the time offset of the echo return relative to the time at which the original signal was generated. The problem of echoes in voice communications is aggravated by the use of packet data networks. In particular, the increased transmission delay times that are experienced in connection with packet data networks can make echoes more apparent to users.

In order to detect the presence of echoes in a communication network, equipment is available that utilizes synthetic test echoes. However, conventional test equipment requires that a network be taken out of service before testing can be performed. In addition, conventional test equipment can be difficult to calibrate and use. Echo can also be detected as a result of complaints by actual users of a communication network. However, when echo rises to the level that users or customers complain, it is too late to prevent a dissatisfied customer.

SUMMARY OF THE INVENTION

The present invention is directed to solving these and other problems and disadvantages of the prior art. Generally, according to the present invention, an outgoing portion of a voice communication signal is monitored. In addition, an incoming portion of the voice communication signal is monitored. The outgoing signal is time aligned with the incoming signal, and a correlation procedure is performed. From the results of the correlation procedure, a determination can be made as to whether echo is present in the voice communication signal In accordance with an embodiment of the present invention, the outgoing portion of the communication signal is filtered using an adaptive filter. A parameter of the adaptive filter may be altered in response to an error signal calculated from the difference between the filtered outgoing portion of the voice communication signal and the time aligned incoming portion of the voice communication signal. In particular, taps associated with the adaptive filter are altered in order to reduce the observed error. A ratio of the power of the time aligned incoming signal to the power of the error signal is then calculated. The presence of an echo is signaled if the calculated ratio is greater than a predetermined amount. In accordance with another embodiment of the present invention, the time delay observed between the outgoing portion of the voice communication signal and the incoming portion of the voice communication signal is calculated. The time delay and the calculated ratio of the power of the incoming signal to the difference signal may then be used to characterize the severity of detected echo in a voice communication system.

In accordance with another embodiment of the present invention, the outgoing signal is time aligned with the incoming signal. A signal monitor then determines whether the periodicity of the signals is less than a predetermined amount. If the periodicity is less than the predetermined amount, a determination is next made as to whether the echo power is greater than a predetermined power. If the echo exceeds the predetermined power, a signal indicating that echo is present in the communication is generated.

In accordance with still another embodiment of the present invention, the outgoing and incoming voice signals are time aligned and provided to a signal monitor. The signal monitor then determines whether the mel-frequency cepstral coefficient is greater than a predetermined amount. If the predetermined amount is exceeded, a signal indicating that echo is present in the communication is generated.

In accordance with yet another embodiment of the present invention, multiple time alignment steps may be performed. For example, a step of coarse time alignment may be followed by a step of fine time alignment.

In accordance with an embodiment of the present invention, a system for detecting echo in an in-service voice communication network is provided. The system generally includes a first electronic signal path that is operable to receive an outgoing component of a voice communication signal. The device additionally includes a second electronic signal path that is operable to receive an incoming component of the voice communication signal. A time alignment block is provided for aligning the outgoing component with the incoming component. An adaptive filter filters the outgoing component of the voice communication signal received by the first electronic signal path. A summing block is provided for computing an error signal from the difference between the filtered and time aligned outgoing component of the voice communication signal and the incoming component. In addition, a signal monitor receives the incoming signal and the error signal, from which a determination regarding the presence of echo can be made. In accordance with a further embodiment of the present invention, a feedback signal line is provided for transmitting the error signal computed by the summing block to the adaptive filter. In still another embodiment, the device may include a communication network interface for interconnecting the first and second electronic signal paths to a communication network. The interface may, in accordance with an embodiment of the present invention, comprise an interface with a voice over Internet protocol network.

In accordance with another embodiment of the present invention, a system for detecting echo in an in-service voice communication network is provided in which a time alignment unit is provided. The time alignment unit receives as inputs the outgoing signal and the incoming signal associated with a voice communication. The time alignment unit is interconnected to a signal monitor. The signal monitor is provided with the time aligned outgoing signal and the incoming signal, from which a determination as to the presence of echo can be made.

These and other advantages and features of the invention will become more apparent from the following discussion, particularly when taken together with the accompanying drawings.

DETAILED DESCRIPTION

The present invention is directed to the detection of echoes in an in-service communication network.

Figure 1:
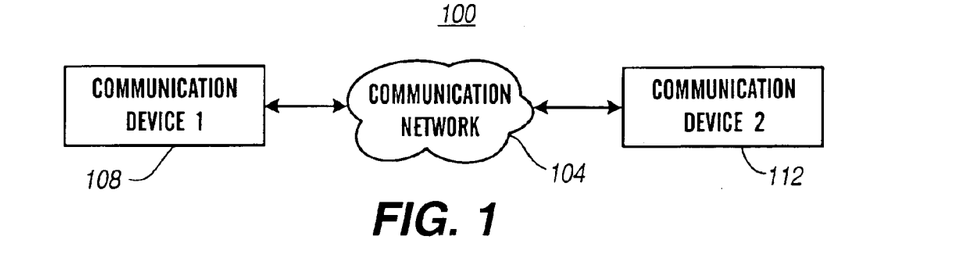
FIG. 1 depicts a communication system in connection with which an embodiment of the present invention may be used.

In FIG. 1, a communication system 100 suitable for use in connection with an embodiment of the present invention is depicted. In general, the communication system 100 includes a communication network 104, a first communication device 108, and a second communication device 112. The communication network 104 may comprise one or more networks of various types. For example, the communication network 104 may comprise the public switched telephone network. In accordance with another embodiment of the present invention, the communication network 104 comprises a packet data network over which voice communications are transmitted in accordance with a voice over Internet protocol. The communication devices 108, 112 may comprise any type of communication device suitable for use in connection with voice communications. Accordingly, examples of communication devices 108, 112 include telephones, soft telephones, and wireless voice communication devices.

As is well known to one skilled in the art, a voice communication transmitted from the first communication device 108 will be received at the second communication device 112 as a distorted version of the original. In particular, the voice communication is delayed in time, and distortion may be introduced by the components of the system 100. Furthermore, in transmitting voice communications between a first 108 and second 112 communication device, the system 100 introduces various sources of echo. For example, acoustical reverberations in a communication device 108 or 112 may create echoes in the transmission of voice communications between the communication devices 108, 112. In addition, hybrid unbalanced conditions at interconnections between components of the system 100 may introduce echo. The effect of echo on sound quality may be increased by other characteristics of the system 100. For example, switching and transmission delays introduced by the communication network 104 can make echoes present in the system 100 more apparent. Transmission delays can be especially problematic in connection with communication networks 104 that utilize voice over Internet protocol (VoIP) transmission techniques.

Figure 2:
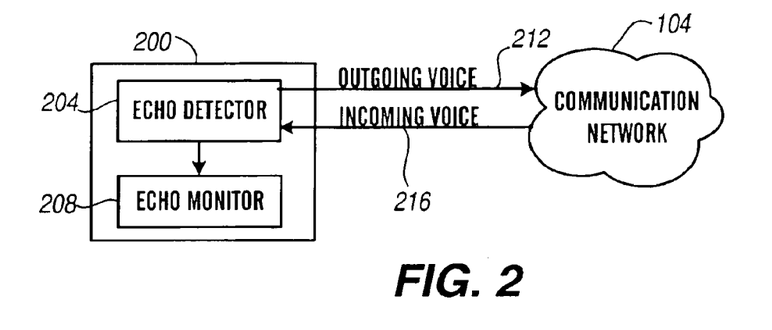
FIG. 2 depicts an echo detection arrangement in accordance with an embodiment of the present invention.

With reference now to FIG. 2, an echo detection system 200 is illustrated in connection with a communication network 104. In accordance with an embodiment of the present invention, the echo detection system 200 may be provided as part of a communication device 108, 112. In accordance with another embodiment of the present invention, the echo detection system 200 may be provided as part of a gateway to a communication network 104, including a voice over Internet protocol network. In accordance with such an embodiment of the present invention, a communication device 108, 112 is generally connected to the communication network 104 through the gateway incorporating the echo detection system 200.

As shown in FIG. 2, the echo detection system 200 generally includes an echo detector 204 and an echo monitor 208. In general, the echo detection system 200 detects the presence of echo in voice communications at the point in the communication system 100 monitored by the echo detection system 200. The echo detector 204 generally functions to monitor an outgoing component or portion 212 of a voice communication, and an incoming component or portion 216 of the same voice communication. The echo monitor 208, which may be provided as part of an echo detection device 200, but is not required, generally functions to provide an indication of the magnitude of a detected echo. In accordance with an embodiment of the present invention, the echo monitor 208 receives information regarding the amplitude or power of a detected echo and the amount of time by which the echo signal is shifted with respect to the reference signal. Using that information, the echo monitor 208 may characterize the effect of the echo on the voice communication taking place.

Figure 3:
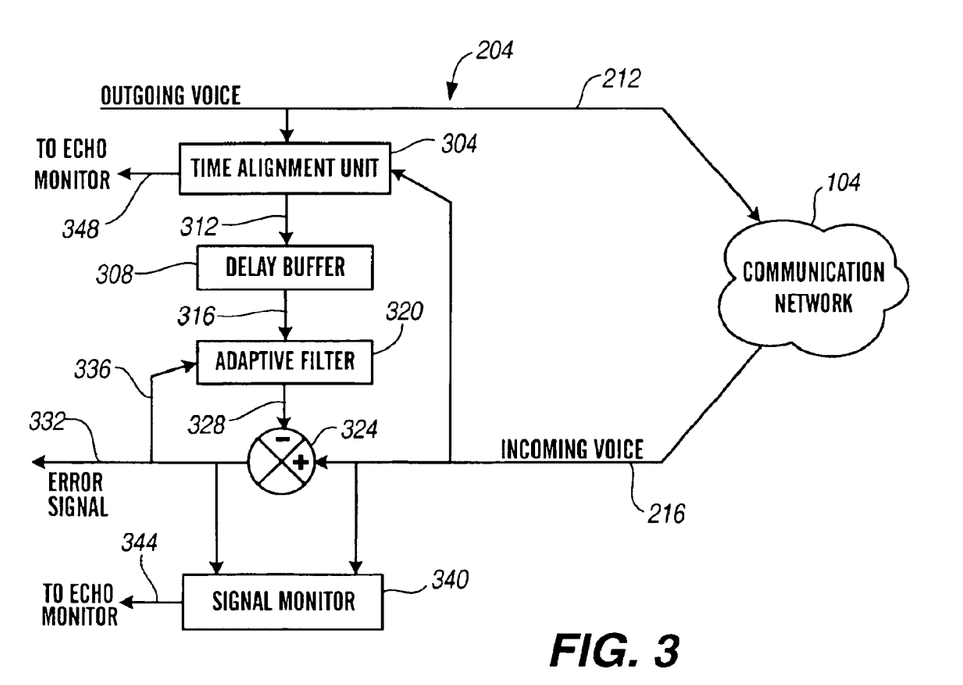
FIG. 3 depicts an echo detector in accordance with an embodiment of the present invention.

With reference now to FIG. 3, aspects of an echo detector 204 are illustrated. As shown in FIG. 3, the echo detector 204 monitors the outgoing voice signal 212 as the outgoing voice signal 212 is provided to the communication network 104. The echo detector 204 provides the outgoing voice signal 212 to a time alignment unit 304. In addition, the echo detector 204 monitors the incoming voice signal 216 received from the communication network 104. The incoming voice signal 216 is also provided to the time alignment unit 304. As noted above, the outgoing 212 and incoming 216 voice signals generally comprise the outgoing and incoming portions of a voice communication between a first communication device 108 at an end of the communication network 104 proximate to the echo detector 204, and a second communication device 112 at the far end of the communication network 104. A delay buffer 308 may be provided to delay the time aligned output signal 312 output from the time alignment unit 304. The output 316 from the delay buffer 308 may then be provided to an adaptive filter 320. A summing block 324 receives a filtered, time aligned, outgoing voice signal 328 from the adaptive filter 320, and the incoming voice signal 216 from the communication network 104. The output of the summing block 324 is an error signal 332. The error signal 332 may be fed back to the adaptive filter 320 over a feedback signal line 336. In accordance with another embodiment of the present invention, no delay buffer 308 is provided, and the output 312 of the time alignment unit 304 is connected directly to an input of the adaptive filter 320.

The time alignment unit 304 generally operates to align the outgoing 212 and incoming 216 signals in time, and to determine a time delay between the transmitted or outgoing signal 212 and the received or incoming signal 216. Accordingly, the time alignment unit 304 receives as a first input the outgoing voice signal 212 and as a second input the incoming voice signal 216. In general, time alignment may comprise a coarse time alignment procedure that is followed by a fine time alignment procedure.

Figure 5A:
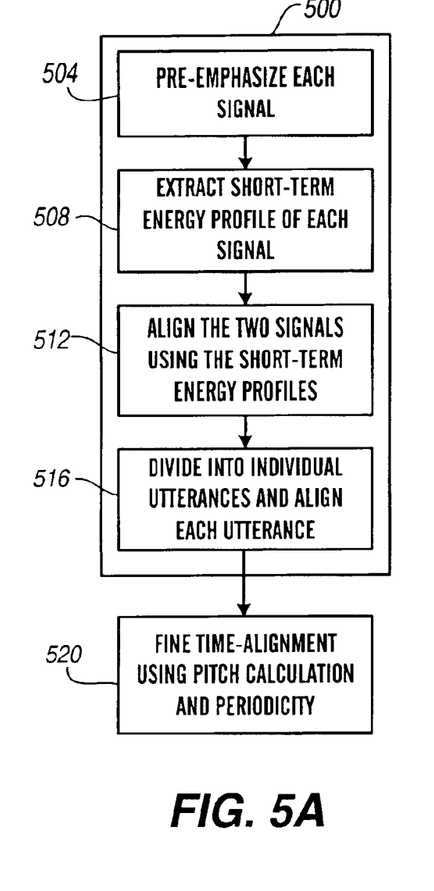
FIG. 5A is a flow chart illustrating the time alignment of signals in accordance with an embodiment of the present invention.

According to an embodiment of the present invention, and with reference to FIG. 5A, a coarse time alignment procedure 500 performed by a time alignment unit 304 includes a step of preemphasizing the outgoing signal 212 and the incoming signal 216 (step 504). During this step of preemphasizing each signal, a simple first order filter is applied to the signals to assist in identifying voice utterances. At step 508, the short-term energy profile of the outgoing 212 and incoming 216 signals is extracted. This provides a smooth envelope, or a rough shape of the energy contained in each signal as a function of time. The two signals 212, 216 are then aligned using the short-term energy profiles (step 512). In particular, the two smoothed envelopes obtained by extracting the short-term energy profile of each signal are cross-correlated. The signals 212, 216 are then divided into individual utterances, and the utterances from the outgoing signal 212 are aligned with the utterances from the incoming signal 216 (step 516). As can be appreciated by one of skill in the art, utterances are segments of active speech, as opposed to silence. This step distinguishes and segments the individual utterances. The alignment of the utterances is performed using cross-correlation techniques. Following the coarse alignment 500 of the signals 212, 216, a fine time alignment is performed using pitch calculation and periodicity (step 520).

Figure 4:
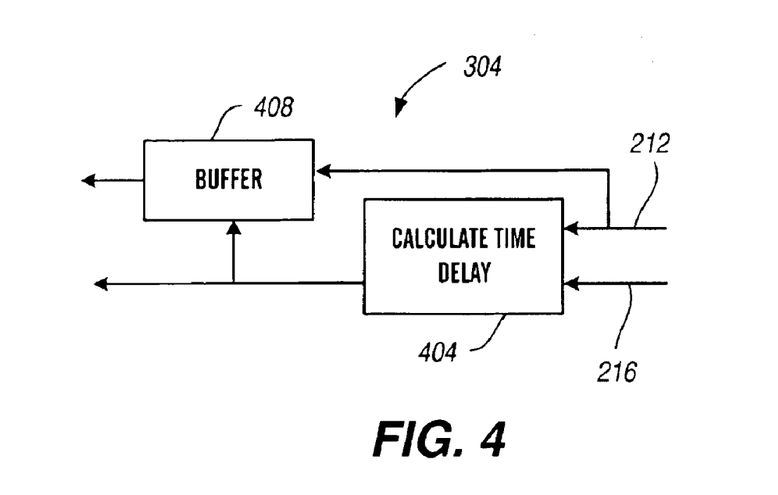
FIG. 4 depicts a time alignment unit in accordance with an embodiment of the present invention.
Figure 5B:
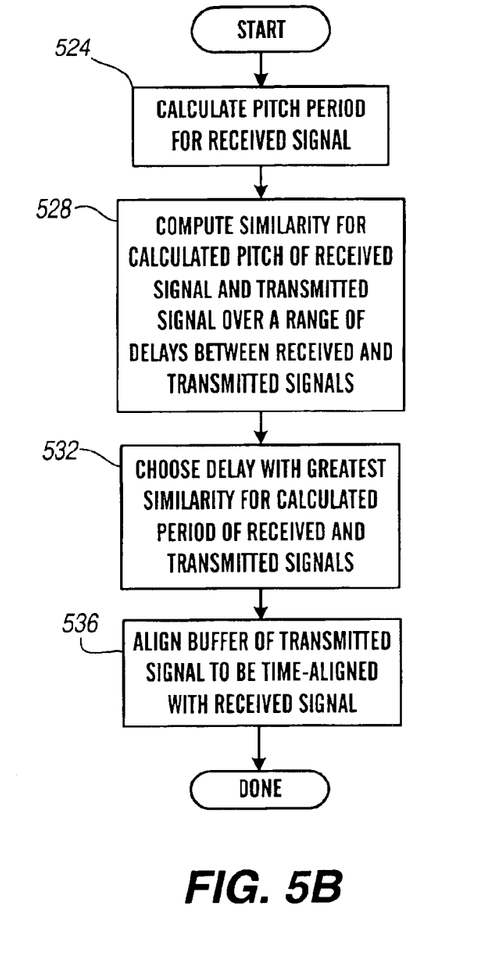
FIG. 5B is a flow chart illustrating the time alignment of signals in accordance with another embodiment of the present invention.

With reference now to FIGS. 4 and 5B, the fine time alignment of outgoing 212 and incoming 216 signals in accordance with an embodiment of the present invention is illustrated. According to such an embodiment, block 404 of the time alignment unit 304 calculates the time delay by calculating the pitch period for a buffer of samples of the incoming voice signal 216 (step 524). The similarities between the pitch of the incoming signal 216 and the pitch of the outgoing signal 212 are then computed over a range of delays for each period of delay (step 528). Once the similarities have been determined for each delay within the range of delays, the delay that produced the greatest similarity for the calculated period within the received and transmitted signals is chosen as the actual delay (step 532). The period of delay thus determined is then provided to a buffer 408 within the time alignment unit 304, and the buffer 408 holds the outgoing signal for the period of delay (step 536). The output of the time alignment unit 304 is a time aligned version of the outgoing signal, also referred to herein as a time aligned outgoing signal. For additional disclosure and information regarding the operation of a time alignment unit 304 in accordance with an embodiment of the present invention, reference is made to U.S. patent application Ser. No. 10/152,716, filed May 22, 2002, and assigned to the assignee of the present application, the entire disclosure of which is hereby incorporated by reference.

The delay buffer 308 is generally provided to ensure a causal system. In particular, a small delay, for example of about 10 milliseconds, is added to the time aligned signal 312 to ensure that it cannot occur ahead of the incoming signal 216. Accordingly, the introduction of a delay by the delay buffer 308 ensures the proper operation of the adaptive filter 320.

The adaptive filter 320 generally operates to minimize the error between the incoming signal 216 and the outgoing, time aligned signal 312 by filtering the outgoing signal. By minimizing the error or difference 332 between the filtered outgoing voice signal 328 and the incoming signal 216, any echo present in the incoming voice signal 216 is made more apparent. In particular, if the incoming signal 216 is similar to the filtered outgoing signal 328, the error signal 332 will be small, and thus the ratio of the incoming signal 216 to the error signal 332 will be large. Furthermore, because the adaptive filter 320 is provided with the error signal 332 as feedback 336, portions of the outgoing signal 212 that are different from the time aligned incoming signal 320 can be more accurately filtered out, so that the error signal 332 is an even better indicator of the presence or absence of echo in the incoming signal 216.

A signal monitor 340 is also provided as part of the echo detector 204. In general, the signal monitor 340 receives the incoming voice signal 216 and the error signal 332. The signal monitor 340 then calculates the ratio of the power of the incoming signal 216 to the power of the error signal 332. In accordance with an embodiment of the present invention, if the calculated ratio is greater than a predetermined threshold amount, a signal indicating the presence of echo is generated on the echo signal line 344 by the signal monitor 340. In accordance with an embodiment of the present invention, the echo signal line 344 is interconnected to the echo monitor 208. A time delay signal line 348 may also be provided to communicate the period of delay (i.e., the time offset between the outgoing signal 212 and the incoming signal 216) determined by the time alignment unit 304 to the echo monitor 208.

Figure 6:
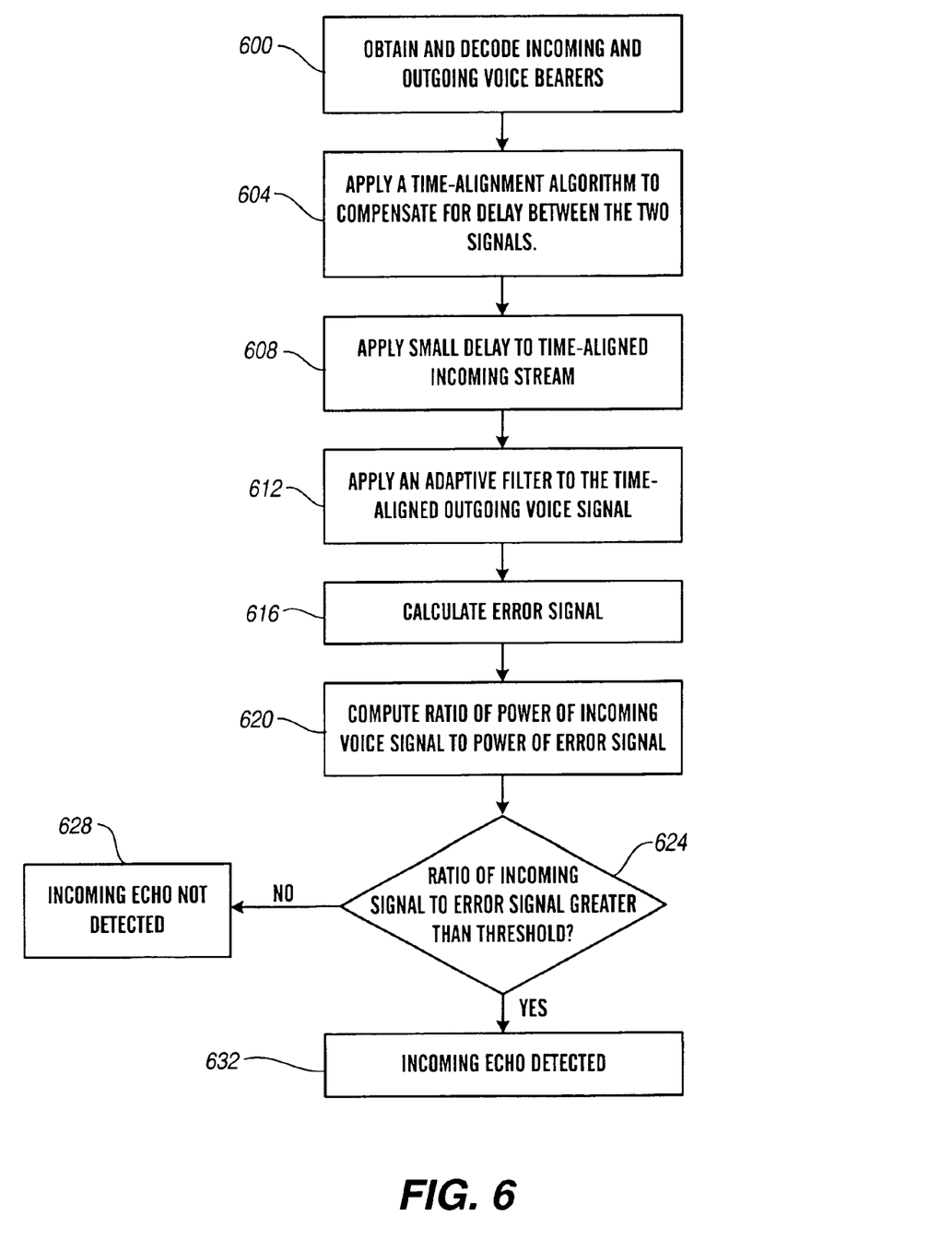
FIG. 6 is a flow chart illustrating the detection of echoes in accordance with an embodiment of the present invention.

With reference now to FIG. 6, the operation of an echo detection system 200 in accordance with an embodiment of the present invention is illustrated. Initially, at step 600, the incoming 216 and outgoing 212 voice bearer channels associated with a voice communication are obtained and decoded. At step 604, a time alignment algorithm such as is described above with reference to FIGS. 4, 5A and 5B is applied to compensate for the delay between the outgoing 212 and incoming 216 signals. Next, an optional step of applying a small additional time delay to the time aligned voice signal 312 is shown (step 608). In general, the addition of delay to the time aligned signal 312 is desirable to ensure a causal echo detection system 200.

At step 612, the adaptive filter 320 is applied to the time aligned outgoing voice signal 212. In general, the taps of the adaptive filter 320 may be altered in response to the error signal 332. In particular, the provision of feedback in the form of the error signal 332 over feedback signal line 336 allows the adaptive filter 320 to be altered such that the error signal 332 is minimized. In step 616, the error or difference signal 332 is calculated by taking the difference between the incoming signal 216 and the time aligned filtered outgoing signal 328 at the summing block 324. The ratio of the incoming signal power 216 to the power of the error signal 332 is then calculated (step 620). In accordance with an embodiment of the present invention, the ratio taken is the echo return loss enhancement (ERLE), given by the equation:

$$ERLE = 10 \log_{10} \left[ \frac{\sum_{n=0}^{N-1} [d[n]]^2}{\sum_{n=0}^{N-1} [e[n]]^2} \right],$$

where d[n] is the incoming signal 216 and e[n] is the error signal 332.

At step 624, a determination is made as to whether the ratio of the power of the incoming signal 328 to the power of the error signal 332 is greater than a predetermined threshold. If the calculated ratio is not greater than the predetermined threshold, incoming echo is not detected (step 628). If the calculated ratio is greater than the selected threshold, incoming echo is considered to be detected (step 632).

Figure 7:
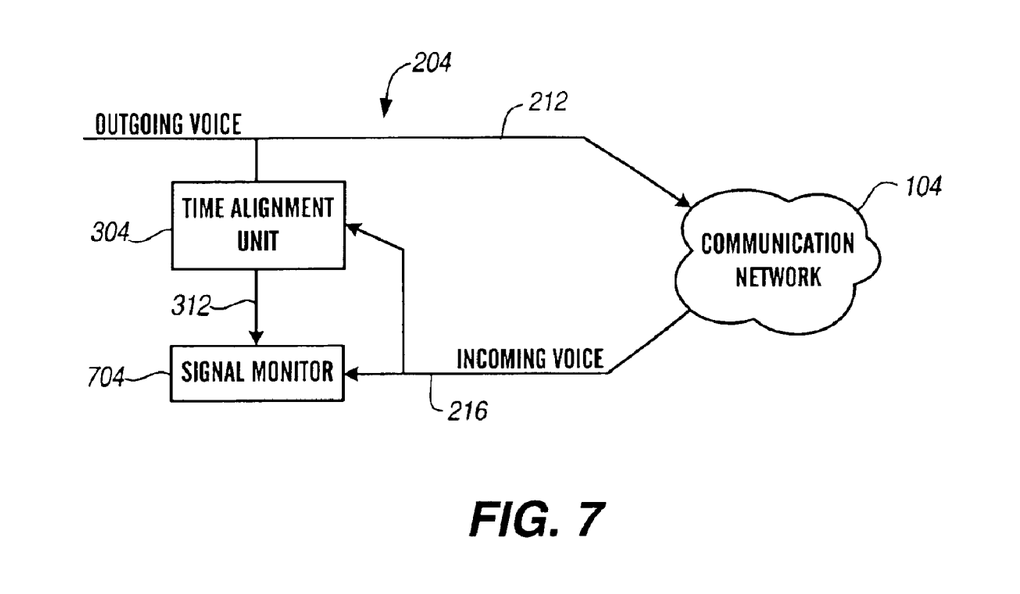
FIG. 7 depicts an echo detector in accordance with another embodiment of the present invention.

FIG. 7 illustrates aspects of an echo detector 204 in accordance with another embodiment of the present invention. As shown in FIG. 7, the echo detector 204 monitors the outgoing voice signal 212 as that signal is provided to a communication network 104. The outgoing voice signal 212 is provided to a time alignment unit 304. In addition, the echo detector 204 monitors the incoming voice signal 216 received from the communication network 104. The incoming voice signal 216 is also provided to the time alignment unit 304. As noted above, the outgoing 212 and incoming 216 voice signals may comprise the outgoing and incoming portions of a voice communication between a first communication device 108 at an end of the communication network 104 proximate to the echo detector 204, and a second communication device 112 at the far end of the communication network 104. The time alignment unit 304 then provides a time aligned outgoing voice signal 312 to a signal monitor 704. In accordance with an embodiment of the present invention, the signal monitor 704 determines whether echo is detected in the system 100 by evaluating the periodicity of the signal and the echo power. In accordance with another embodiment of the present invention, the signal monitor 704 determines whether echo is present in the system 100 by evaluating the mel-frequency cepstral coefficient (MFCC). An echo signal line may interconnect the signal monitor 704 to an echo monitor 208. In addition, a time delay signal may provide the period of delay determined by the time alignment unit 304 to the echo monitor 208.

Figure 8:
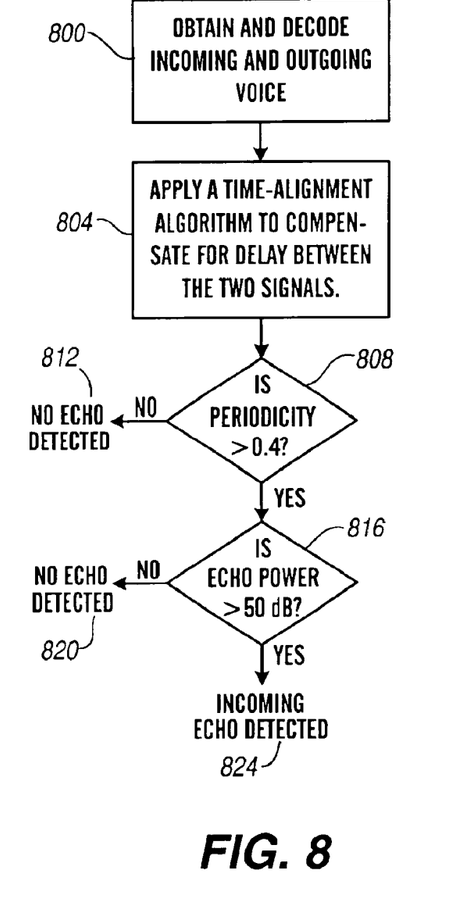
FIG. 8 is a flowchart illustrating the detection of echoes in accordance with another embodiment of the present invention.

With reference now to FIG. 8, the operation of an echo detection system 200 in accordance with an embodiment of the present invention as illustrated in FIG. 7 is shown. Initially, at step 800, the incoming 216 and outgoing 212 voice bearer channels associated with the voice communication are obtained and decoded. At step 804, a time alignment algorithm is applied to compensate for the delay between the outgoing 212 and incoming 216 signals. At step 808, the periodicity of the signals is compared to a threshold amount. As can be appreciated by one of skill in the art, periodicity is a measure of whether signal is periodic or aperiodic. For example, a tone or sinusoid is periodic, whereas white noise is aperiodic. Since real world signals such as speech occur somewhere between the extremes of a perfectly periodic signal tone and white noise, measuring the periodicity of a signal gives an indication as to whether the received signal is more like a periodic signal tone or aperiodic noise. In accordance with an embodiment of the present invention, the periodicity is given by the following procedure:

Assume x[n] are samples of the outgoing signal and y[n] are samples of the incoming signal. Assume d is the delay between outgoing and incoming signal and T is the pitch period. The periodicity is calculated in two steps:

$$A = \frac{\sum_{n=0}^{T} [x[n-d]y[n]]}{\sum_{n=0}^{T} [x[n-d]]^2} \quad (1)$$

$$P = \frac{\sum_{n=0}^{T} [y[n] - Ax[n-d]]}{\sum_{n=0}^{T} [y[n]]^2} \quad (2)$$

In accordance with such an embodiment of the present invention, the signal may be considered free from echo (step 812) if the periodicity (p) is greater than or equal to 0.4.

If the periodicity is greater than or equal to the threshold amount, a determination is made as to whether the echo power is greater than the threshold (step 816). In accordance with an embodiment of the present invention, the echo power is given by the following equation:

$$\text{Echo Power} = 10 \log_{10}\left[\frac{1}{N}\sum_{n=0}^{N-1}[d[n]]^2\right],$$

where d[n] represents the incoming signal 216. If the echo power is not greater than the threshold amount, then no echo is considered to be present in the signal (step 820). If the echo power is greater than the threshold amount, then incoming echo is detected (step 824). In accordance with an embodiment of the present invention, echo is considered present in the incoming signal 216 if the calculated echo power is greater than 50 decibels.

Figure 9:
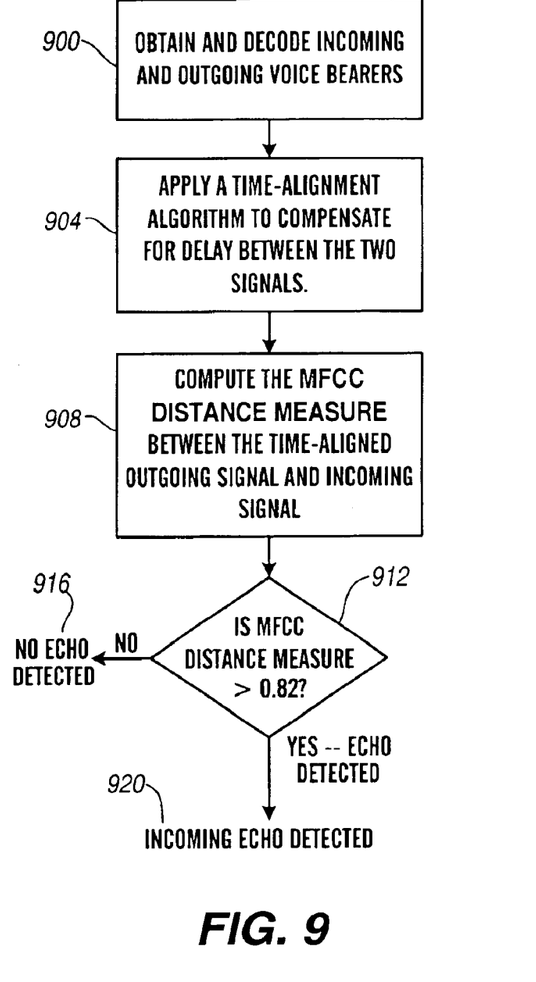
FIG. 9 is a flowchart illustrating the detection of echoes in accordance with yet another embodiment of the present invention.

With reference now to FIG. 9, the operation of an echo detector 204 in accordance with yet another embodiment of the present invention is illustrated. Initially, at step 900, the incoming 216 and outgoing 212 voice bearer channels associated with the voice communication are obtained and decoded. At step 904, a time alignment algorithm is applied to compensate for the delay between the two signals 212, 216. At step 908, the mel-frequency cepstral coefficient distance, measured between the time aligned outgoing signal 312 and the incoming signal 216 is computed. At step 912, a determination is made as to whether the MFCC distance is greater than a threshold amount. If the MFCC distance is not greater than the threshold amount, then no echo is detected (step 916). If the MFCC distance is greater than the threshold amount, then incoming echo is detected (step 920). In accordance with an embodiment of the present invention, incoming echo is considered present if the MFCC distance measure is greater than 0.82.

From the description given above, it can be appreciated that the present invention allows for the detection of echo in connection with voice communications, while a communication system 100 is an actual operation. If desired, measures to mitigate the echo may be taken in response to a determination that echo is present.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for detecting echo in an in-service network, comprising:

time aligning an outgoing signal with an incoming signal to obtain a time aligned outgoing signal;

filtering said time aligned outgoing signal to obtain a filtered time aligned outgoing signal;

calculating a periodicity from said filtered time aligned outgoing signal and said incoming signal;

determining a difference between said filtered time aligned outgoing signal and said incoming signal to create a difference signal;

computing a ratio comprising a power of said incoming signal to a power of said difference signal; and signaling the presence of echo when said periodicity is greater than a first predetermined amount, and said ratio is greater than a second predetermined amount.

2. The method of claim 1, further comprising:

time delaying said time aligned outgoing signal.

3. The method of claim 1, wherein said step of filtering comprises:

altering at least a first filter parameter in response to said difference signal.

4. The method of claim 3, wherein said at least a first filter parameter is altered to reduce said difference between said filtered time aligned outgoing signal and said incoming signal.

5. The method of claim 1, wherein said incoming signal is received from a communication network comprising a voice over Internet protocol network.

6. The method of claim 1, further comprising:

determining a time delay between said outgoing signal and said incoming signal.

7. The method of claim 1, wherein said outgoing and incoming signals comprise voice communication signals.

8. A system for detecting echo in an in-service voice network, comprising:

means for receiving an outgoing first voice communication signal and an incoming first voice communication signal, wherein said outgoing first voice communication signal and said incoming first voice communication signal are related as two components of a full duplex voice communication;

means for aligning said outgoing first voice communication signal and said incoming first voice communication signal;

means for calculating a periodicity from said incoming first voice communication signal and said outgoing voice communication signal;

means for filtering, wherein said outgoing first voice communication signal is filtered to create a filtered signal;

means for determining an error signal from a difference between said incoming voice communication signal and said filtered signal;

means for computing a ratio of a power of said incoming first signal to a power of said filtered signal; and means for indicating the presence of echo if said ratio is at least a first predetermined value and if said periodicity is at least a second predetermined value.

9. The system of claim 8, further comprising:

means for delaying said outgoing first signal.

10. The system of claim 8, further comprising:

means for providing said error signal to said means for filtering.

11. The system of claim 10, wherein said means for filtering comprises an adaptive filter.

12. The system of claim 8, wherein said incoming first voice communication signal is received from a communication network comprising a voice over Internet protocol network.

13. The system of claim 8, wherein said means for receiving comprises at least a first decoder.

14. A method for detecting echo comprising:

time shifting an outgoing component of a voice communication to obtain a time shifted outgoing component of said voice communication, wherein said outgoing component is time aligned with an incoming component of maid voice communication;

filtering said time shifted outgoing component of said voice communication to obtain a filtered time shifted outgoing component of said voice communication;

calculating a periodicity from said filtered time shifted outgoing component of said voice communication and said incoming component of said voice communication;

calculating an error signal from a difference between said incoming component and said filtered time shifted outgoing component of said voice communication;

calculating a ratio between a power of said incoming component of said voice communication and said error signal; and providing an indication that echo is present in said voice communication in response to a periodicity that is greater than a first threshold amount and a calculated ratio that is greater than a second threshold amount.

15. The method of claim 14, further comprising:

providing said error signal to said filter;

altering at least a first parameter of said filter in response to a change in said error signal.

16. The method of claim 14, further comprising:

calculating a time delay between said outgoing component of said voice communication and at least a portion of said incoming component of said voice communication.

17. The method of claim 14, wherein said method is performed by executing instructions stored on a computer readable storage medium.

18. A device for detecting the presence of echo, comprising:

a time alignment block, wherein an outgoing component of a voice communication is aligned in time with an incoming component of said voice communication to obtain a time aligned outgoing component;

an adaptive filter, wherein said time aligned outgoing component is filtered to obtain a filtered time aligned outgoing component;

a summing block, wherein an error signal is computed from a difference between said filtered time aligned outgoing component and said incoming component; and a signal monitor, wherein a periodicity is calculated from said filtered time aligned outgoing component of said voice communication and said incoming component of said voice communication, wherein an echo detection signal is generated in response to a calculated periodicity that is greater than a first threshold amount and a ratio of an incoming signal power to an error signal power that is greater than a second threshold amount.

19. The device of claim 18, further comprising:

an error signal feedback signal line, wherein said error signal is provided to said adaptive filter.

20. The device of claim 18, further comprising:

a communication network interface, whereby said first and second electronic signal paths are interconnected to a communication network.

21. The device of claim 20, wherein said communication network comprises an interface with a voice over Internet protocol network.

* * * * *